United States Patent
Tsukamoto et al.

(10) Patent No.: US 6,908,225 B2
(45) Date of Patent: Jun. 21, 2005

(54) FAILURE DIAGNOSING APPARATUS FOR AN ENGINE COOLING WATER TEMPERATURE SENSOR

(75) Inventors: Toshinori Tsukamoto, Wako (JP); Yoshitaka Takasuka, Wako (JP); Eisaku Gosyo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/771,498

(22) Filed: Feb. 5, 2004

(65) Prior Publication Data

US 2004/0184507 A1 Sep. 23, 2004

(30) Foreign Application Priority Data

Feb. 20, 2003 (JP) ........................................ 2003-042069

(51) Int. Cl.$^7$ ........................ G01K 15/00; G01K 13/00
(52) U.S. Cl. ............................. 374/1; 374/145; 701/34
(58) Field of Search ........................... 374/1, 144, 145, 374/112; 701/34; 702/99, 104, 116, 183, 185

(56) References Cited

U.S. PATENT DOCUMENTS

| | | | | |
|---|---|---|---|---|
| 4,393,365 A | * | 7/1983 | Kondo et al. ............... | 374/145 |
| 4,949,078 A | * | 8/1990 | Ito et al. ....................... | 701/34 |
| 5,107,246 A | * | 4/1992 | Mogaki ....................... | 701/34 |
| 5,614,664 A | * | 3/1997 | Yamagishi .................... | 374/1 |
| 6,200,021 B1 | * | 3/2001 | Mitsutani et al. ............. | 374/1 |
| 6,283,092 B1 | * | 9/2001 | Jung ............................ | 374/1 |
| 6,321,695 B1 | * | 11/2001 | Yoo et al. ................. | 123/41.15 |
| 6,463,892 B1 | * | 10/2002 | Russell ..................... | 123/41.15 |
| 6,615,154 B2 | * | 9/2003 | Fujimoto et al. .............. | 374/1 |
| 6,684,154 B2 | * | 1/2004 | Isobe et al. ................... | 701/34 |
| 2002/0002429 A1 | * | 1/2002 | Sugimura et al. ............. | 701/34 |
| 2004/0168510 A1 | * | 9/2004 | Wakahara et al. ............. | 374/1 |

FOREIGN PATENT DOCUMENTS

| | | | | |
|---|---|---|---|---|
| JP | 2000-045851 | | 2/2000 | |
| JP | 2000220456 A | * | 8/2000 | ............. F01P/7/16 |
| JP | 2000-282930 | | 10/2000 | |

* cited by examiner

Primary Examiner—Gail Verbitsky
Assistant Examiner—Mirellys Jagan
(74) Attorney, Agent, or Firm—Arent Fox, PLLC

(57) ABSTRACT

The invention provides a failure diagnosing apparatus having a first sensor for detecting a temperature of cooling water of an engine mounted on a vehicle and a second sensor for detecting a temperature associated with the engine. The apparatus calculates a first difference between a temperature detected by the first sensor at the time when the engine stops in a previous operating cycle and a temperature detected by the first sensor at the time when the engine starts in a current operating cycle is calculated. The apparatus also calculates a second difference between a temperature detected by the second sensor at the time when the engine stops in the previous operating cycle and a temperature detected by the second sensor at the time when the engine starts in the current operating cycle. It is determined whether the first sensor is faulty based on the first difference and the second difference.

21 Claims, 9 Drawing Sheets

FAILURE DIAGNOSING APPARATUS FOR AN ENGINE COOLING WATER TEMPERATURE SENSOR

BACKGROUND OF THE INVENTION

The present invention relates to an apparatus for diagnosing failure of a sensor that detects the temperature of cooling water of an internal combustion engine.

A radiator mounted on a vehicle supplies cooling water to an internal combustion engine (hereinafter referred to as "engine") to cool the engine. A sensor for detecting temperature of the cooling water is provided on the engine. This sensor will be hereinafter referred to as an "engine water temperature sensor." The temperature detected by the engine water temperature sensor is used for various controls of the engine. Appropriate controls of the engine require accurate detection of the engine water temperature.

Japanese Patent Application Unexamined Publication (Kokai) No. 2000-45851 shows a method for detecting a failure of the engine water temperature sensor. According to the method, an output of the engine water temperature sensor is monitored over a predetermined time period. If the output of the sensor changes beyond a predetermined range, it is determined that the sensor is normal. If changes in the output of the sensor are within the predetermined range, it is determined that the sensor is faulty.

According to a method shown in Japanese Patent Application Unexamined Publication (Kokai) No. 2000-282930, an elapsed time after the engine stops is measured. If an output of the engine water temperature sensor is greater than a predetermined value when a predetermined time has elapsed, it is determined that the engine water temperature sensor is stuck at a higher temperature level. When the engine starts before the predetermined time elapses, an output of the engine water temperature is obtained. If the obtained output is lower than a predetermined value, it is determined that the engine water temperature sensor is stuck at a lower temperature level.

When an elapsed time from the time when the engine stops in the previous operating cycle is short and operating conditions of the engine are similar to the previous operating cycle, an output of the engine water temperature sensor may change little. In such a case, the conventional methods may incorrectly determine a normal engine water temperature sensor as being faulty.

The conventional methods require a timer for measuring an elapsed time from the time when the engine stops. Providing such a timer leads to an additional cost. Since detection of a failure of the engine water temperature sensor requires that a predetermined time elapses after the engine stops, the frequency of performing the failure detection process is limited.

SUMMARY OF THE INVENTION

According to one aspect of the invention, a failure diagnosing apparatus comprises a first sensor for detecting a temperature of cooling water of an engine mounted on a vehicle and a second sensor for detecting a temperature associated with the engine. In one embodiment, the second sensor detects a temperature of air introduced into the engine. The failure diagnosing apparatus is configured to calculate a first difference between a temperature detected by the first sensor at the time when the engine stops in a previous operating cycle and a temperature detected by the first sensor at the time when the engine starts in a current operating cycle. The failure diagnosing apparatus is further configured to calculate a second difference between a temperature detected by the second sensor at the time when the engine stops in the previous operating cycle and a temperature detected by the second sensor at the time when the engine starts in the current operating cycle. It is determined whether the first sensor is faulty based on the first difference and the second difference.

According to the invention, since it can be determined whether behavior of the first sensor is normal based on the comparison with behavior of the second sensor, it can be prevented that a normal first sensor is incorrectly determined as being faulty. Since both of the first and second sensors are placed under the same external environment, the first sensor exhibits a similar behavior to the second sensor if the first sensor is normal. By taking into account a behavior of the second sensor, it is more accurately determined whether the behavior of the first sensor is normal. There is no need to consider the influence of the external environment so as to determine whether the behavior of the first sensor is normal.

A timer that measures an elapsed time after the engine stops is not required, which leads to cost savings. Since the failure diagnosing process can be performed before a predetermined time elapses from the time when the engine stops, a limitation for the frequency of performing the failure diagnosing process is relaxed.

According to one embodiment of the invention, the failure diagnosing apparatus determines that the first sensor is faulty if a magnitude of the first difference is less than a predetermined value when a magnitude of the second difference is greater than a predetermined value.

An operating state may occur where the temperature of the cooling water changes little even if the first sensor is normal. According to the embodiment, in such an operating state, it is prevented that a normal first sensor is erroneously determined to be faulty because the determination that the first sensor is faulty is permitted if the amount of change in the output of the second sensor is relatively large.

In general, a vehicle comprises an intake air temperature sensor for detecting a temperature of air introduced into the engine for various control of the vehicle. Such an intake air temperature sensor can be used as the second sensor. An additional sensor is not required for detecting a failure of the first sensor.

According to one embodiment of the invention, the failure diagnosing apparatus determines that the first sensor is normal if a magnitude of the first difference is greater than a predetermined value. Thus, normality of the first sensor is promptly detected without requiring an output of the second sensor.

According to one embodiment of the invention, the failure diagnosing apparatus prohibits the determination that the first sensor is faulty if a magnitude of the first difference is less than a predetermined value when a magnitude of the second difference is less than a predetermined value.

The first sensor that exhibits a similar behavior to the second sensor may be normal even if the amount of change in the output of the first sensor is small. According to the embodiment of the invention, the failure determination regarding the first sensor that exhibits such a behavior is prohibited, thereby preventing making an erroneous determination that a normal first sensor is faulty.

According to one embodiment of the invention, the failure diagnosing apparatus permits the determination that the first sensor is faulty if a possibility of a failure of the first sensor is detected in the previous operating cycle.

DESCRIPTION OF THE PREFERRED EMBODIMENTS

Figure 1:
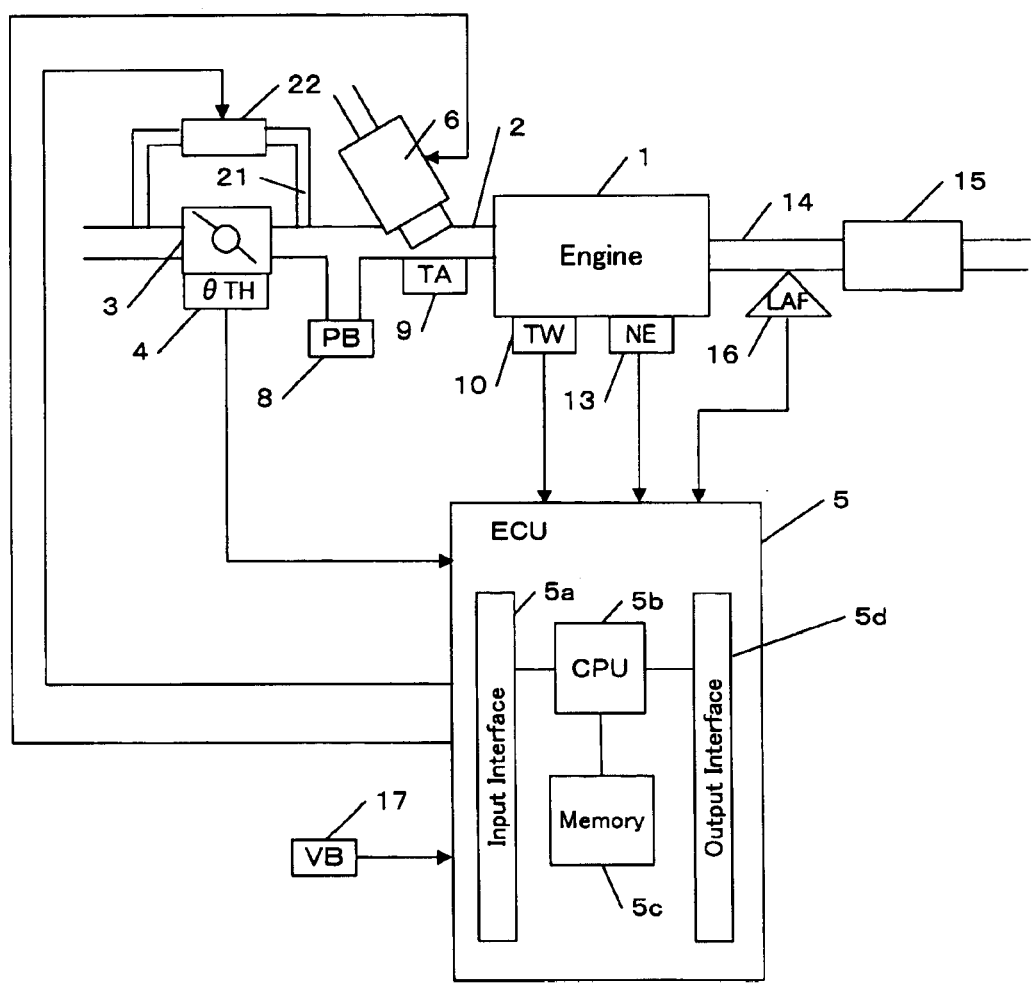
FIG. 1 schematically shows an engine and its control unit in accordance with one embodiment of the present invention.

Referring to the drawings, specific embodiments of the invention will be described. FIG. 1 is a block diagram showing an engine and its control unit in accordance with one embodiment of the invention.

An electronic control unit (hereinafter referred to as an ECU) 5 comprises an input interface 5a for receiving data sent from each part of the engine 1, a CPU 5b for carrying out operations for controlling each part of the engine 1, a memory 5c including a read only memory (ROM) and a random access memory (RAM), and an output interface 5d for sending control signals to each part of the engine 1. Programs and various data for controlling each part of the vehicle are stored in the ROM. A program for performing a failure diagnosing process according to the invention, data and tables used for operations of the program are stored in the ROM. The ROM may be a rewritable ROM such as an EEPROM. The RAM provides work areas for operations by the CPU 5a, in which data sent from each part of the engine 1 as well as control signals to be sent out to each part of the engine 1 are temporarily stored.

The engine 1 is, for example, an engine equipped with four cylinders. An intake manifold 2 is connected to the engine 1. A throttle valve 3 is disposed upstream of the intake manifold 2. A throttle valve opening (θTH) sensor 4, which is connected to the throttle valve 3, outputs an electric signal corresponding to an opening angle of the throttle valve 3 and sends the electric signal to the ECU 5.

A bypass passage 21 for bypassing the throttle valve 3 is provided in the intake manifold 2. A bypass valve 22 for controlling the amount of air to be introduced into the engine 1 is provided in the bypass passage 21. The bypass valve 22 is driven in accordance with a control signal from the ECU 5.

A fuel injection valve 6 is installed for each cylinder at an intermediate point in the intake manifold 2 between the engine 1 and the throttle valve 3. A fuel injection valve 6 is connected to a fuel pump (not shown) and is supplied with fuel from a fuel tank (not shown) via the fuel pump. An opening time of each injection valve 6 is controlled by a control signal from the ECU 5.

An intake manifold pressure (Pb) sensor 8 and an intake air temperature (Ta) sensor 9 are mounted in the intake manifold 2 downstream of the throttle valve 3. A pressure Pb of the intake manifold and a temperature Ta of intake air introduced into the engine detected by the PB sensor 8 and Ta sensor 9 are sent to the ECU 5, respectively.

An engine water temperature (Tw) sensor 10 is attached to the cylinder peripheral wall, which is filled with cooling water, of the cylinder block of the engine 1. A temperature of the engine cooling water detected by the Tw sensor 10 is sent to the ECU 5.

A rotational speed (Ne) sensor 13 is attached to the periphery of the camshaft or the periphery of the crankshaft (not shown) of the engine 1, and outputs a CRK signal at a predetermined crank angle cycle (for example, a cycle of 30 degrees). The cycle length of the CRK signal is shorter than the cycle length of a TDC signal that is issued at a crank angle cycle associated with a TDC position of the piston. Pulses of the CRK signal are counted by the ECU 5 to determine the rotational speed Ne of the engine.

An exhaust manifold 14 is coupled to the engine 1. The engine 1 discharges exhaust gas through the exhaust manifold 14. A catalyst converter 15 installed at an intermediate point in the exhaust manifold 14 purifies undesired substances such as HC, CO and Nox contained in the exhaust gas.

A full range air-fuel ratio sensor (LAF) sensor 16 is mounted upstream of the catalyst converter 15. The LAF sensor 16 detects the oxygen concentration in the exhaust gas in a wide air-fuel ratio zone, from a rich zone where the air-fuel ratio is richer than the theoretical air-fuel ratio to an extremely lean zone. The detected oxygen concentration is sent to the ECU 5.

A vehicle speed (VP) sensor 17 is mounted in the periphery of a drive shaft (not shown) of the vehicle. A pulse that is issued from the VP sensor 17 with each wheel rotation is sent to the ECU 5. The ECU 5 determines a vehicle speed based on the pulses from the VP sensor 17.

Signals sent to the ECU 5 are passed to the input interface 5a. The input interface 5a converts analog signal values into digital signal values. The CPU 5b processes the resulting digital signals, performs operations in accordance with the programs stored in the ROM 5c, and creates control signals. The output interface 5d sends these control signals to actuators for a bypass valve 22, fuel injection valve 6 and other mechanical components.

Figure 2:
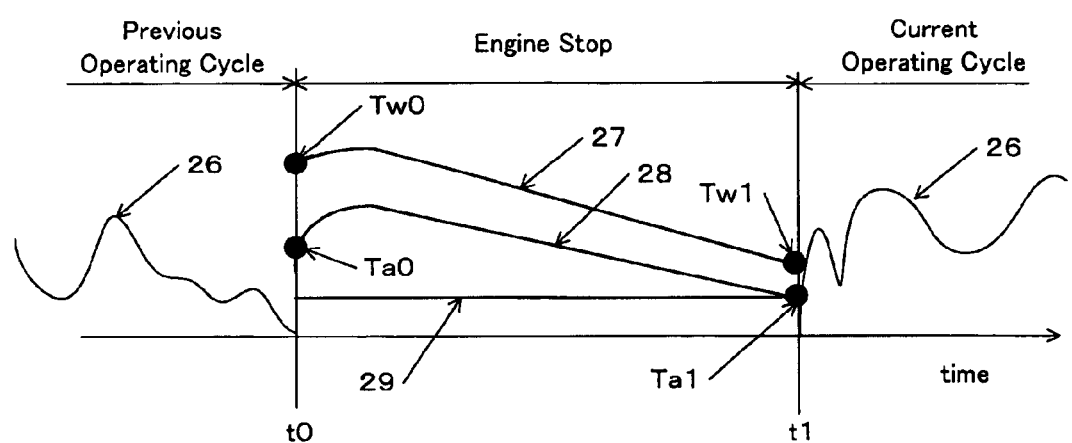
FIG. 2 shows an exemplary behavior of an engine water temperature and an intake air temperature after an engine stops.

FIG. 2 shows an exemplary behavior of the engine water temperature sensor 10 and the intake air temperature sensor 9 while the engine stops. Reference number 26 shows a vehicle speed VP. During a time period from t0 to t1, the engine is turned off and the outside air temperature is almost flat as shown by reference number 29. After the engine stops at time t0, the engine water temperature Tw slightly rises and then gradually falls as shown by reference number 27. The intake air temperature. Ta rises and then gradually falls as shown by reference number 28.

According to one embodiment of the present invention, when the engine stops at time t0, the output Tw0 of the engine water temperature sensor 10 and the output Ta0 of the intake air temperature sensor 9 are stored in the memory 5c (FIG. 1). When the engine starts at time t1, the output Tw1 of the engine water temperature sensor 10 and the output Ta1 of the intake air temperature sensor 9 are obtained.

If a difference between the engine water temperatures Tw0 and Tw1 is greater than a predetermined value, it is determined that the engine water temperature sensor 10 is normal.

If the difference between the engine water temperatures Tw0 and Tw1 is less than or equal to the predetermined value, it is determined whether the engine water temperature sensor 10 is faulty based on the amount of change in the output of the intake air temperature sensor 9. Specifically, if a difference between the intake air temperatures Ta0 at time t0 and Ta1 at time t1 is greater than a predetermined value, it is determined that the engine water temperature sensor 10 is faulty. If the difference between the intake air temperatures Ta0 at time t0 and Ta1 at time t1 is less than or equal to the predetermined value, making the determination that the engine water temperature sensor 10 is faulty is prohibited (or suspended).

The intake air temperature sensor 9 and the engine water temperature sensor 10 are placed under the same external environment. If the engine water temperature sensor is normal, the engine water temperature exhibits a similar behavior to the intake air temperature. A state where the engine water temperature Tw does not change although the intake air temperature Ta changes indicates that the engine water temperature sensor 10 is faulty. Since the amount of change in the intake air temperature is taken into consideration to determine whether the engine water temperature sensor is faulty, it is prevented that a normal engine temperature sensor is erroneously determined to be faulty.

Alternatively, other temperature associated with the engine may be used instead of the intake air temperature. For example, temperature of the lubricating oil for the engine, temperature inside the engine compartment, temperature inside the cylinder of the engine, or the like may be used.

A failure of the engine water temperature sensor that is to be detected by the failure diagnosing apparatus according to the invention includes a condition where the sensor is "stuck." Such a condition where the sensor is stuck indicates that the sensor is incapable of responding to any change in the actual engine water temperature, which may be caused, for example, by a broken wire or a short-circuit.

Figure 3:
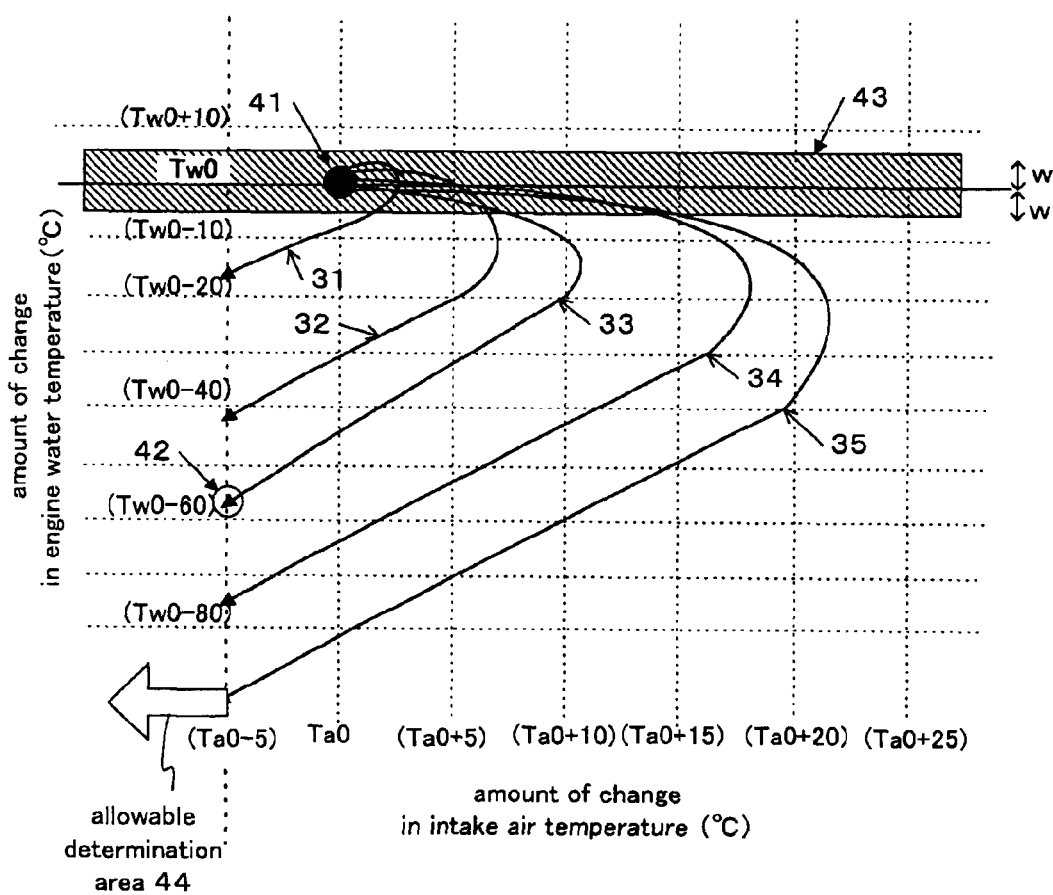
FIG. 3 shows an example of a relationship between the amount of change in engine water temperature and the amount of change in intake air temperature after the engine stops.

FIG. 3 shows an example of a relationship between the amount of change in the engine water temperature Tw and the amount of change in the intake air temperature Ta after the engine stops under different environments. Data shown in FIG. 3 is based on experiments performed by the inventors of the present invention. A curve 31 shows a case where the outside air temperature is 35° C. A curve 32 shows a case where the outside air temperature is 25° C. A curve 33 shows a case where the outside air temperature is 15° C. A curve 34 shows a case where the outside air temperature is 10° C. A curve 35 shows a case where the outside air temperature is 0° C.

Reference number 41 shows an engine-stop point, which is represented by a coordinate (Ta0, Tw0). The intake air temperature Ta0 and the engine water temperature Tw0 obtained when the engine stops are used as reference values. Each curve shows a relationship between the amount of change relative to the reference value Ta0 and the amount of change relative to the reference value Tw0. For example, referring to the curve 33, the intake air temperature rises and then falls after the engine stops. When the intake air temperature Ta is lower than the reference value Ta0 by 5° C., the engine water temperature Tw is lower than the reference value Tw0 by 60° C., as shown by a point 42.

A hatched area 43 indicates a sticking range where the engine water temperature sensor may be stuck. If the engine water temperature Tw changes beyond the sticking range 43, it is determined that the engine water temperature sensor 10 is normal.

The inventors have realized that if the engine water temperature sensor 10 is normal, the engine water temperature Tw surely changes beyond the sticking range 43 while the intake air temperature Ta falls from the reference value Ta0 by a predetermined value (for example, 5° C.) or more. That is, if the engine water temperature sensor 10 is normal, the engine water temperature Tw is surely out of the sticking range 43 when the intake air temperature Ta enters into an allowable determination area 44. Thus, according to one embodiment of the invention, if the engine water temperature Tw is within the sticking range when the intake air temperature Ta enters into the allowable determination area 44, it is determined that the engine water temperature sensor 10 is faulty.

The amount of change "−5° C." from the reference value Ta0 in the intake air temperature shown in FIG. 3, which defines the allowable determination area 44, is one example. The amount of change in the intake air temperature for defining the allowable determination area 44 may be set to an appropriate value, for example, by carrying out an experiment or simulation, in accordance with characteristics of the engine water temperature sensor, the intake air temperature sensor and the engine.

The output of the engine water temperature sensor is converted to a digital value. This digital value includes a noise that is caused, for example, by variations in the ground voltage level and the analog-to-digital conversion process. Therefore, it is preferable that the width "w" relative to the reference value Tw0 of the sticking range 43 is established considering such noise. According to one embodiment of the present invention, the width w is represented by a digital value having a predetermined number of bits (for example, the width w has a digital value of 3).

As an example, it is assumed that the reference value Tw0 of the engine water temperature is converted to a digital value of "3A". The conversion can be performed in accordance with a predetermined rule. A digital value that is lower by three than the digital value "3A" is "37". If the engine water temperature corresponding to a digital value lower than the digital value "37" is detected, it is determined that the engine water temperature sensor 10 is normal. For example, if the detected engine water temperature is "33", it implies that the amount of change relative to the reference value "3A" is seven, which is larger than the width w (3, in this example). Therefore, the engine water temperature sensor 10 is determined to be normal. By representing the width "w" by a digital value, the failure diagnosing process performed by the ECU 5 is simplified.

In a case where the width w of the sticking range 43 is shown by a digital value, a rule for converting an analog output of the engine water temperature sensor to a digital value is specified considering the width w. For example, it is assumed that the width w has a digital value of 3. Digital values are assigned to analog sensor outputs in such a manner that a failure of the engine water temperature sensor is surely detected when the amount of change in the digital value to which the analog sensor output is converted is less than or equal to three.

Figure 4:
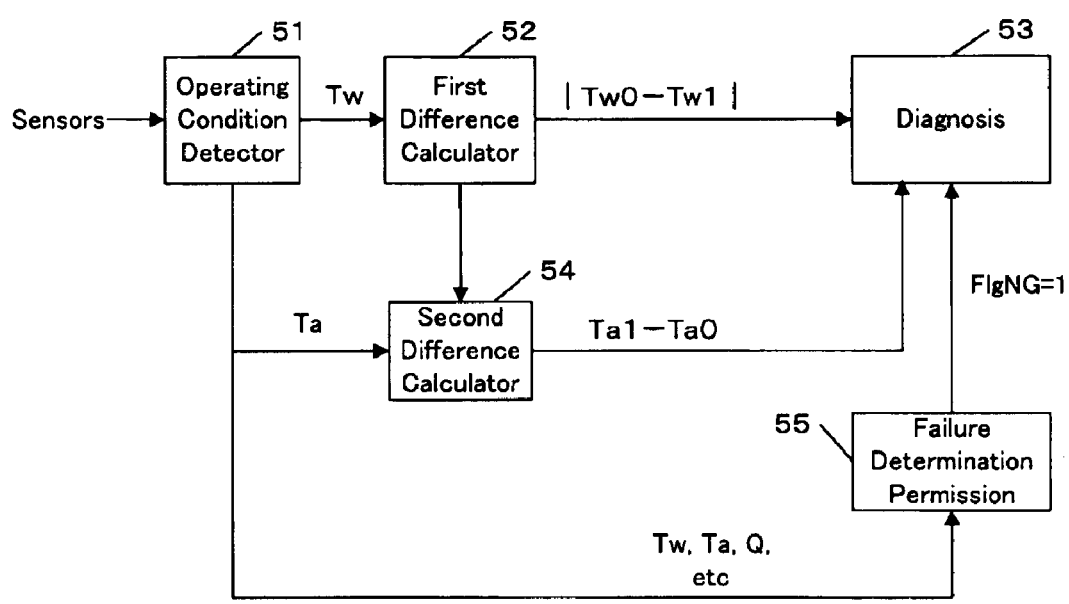
FIG. 4 shows a functional block diagram of a failure diagnosing apparatus for an engine water temperature sensor in accordance with one embodiment of the present invention.

FIG. 4 shows a block diagram of a failure diagnosing apparatus for the engine water temperature sensor in accordance with one embodiment of the present invention. Functions of the blocks are typically implemented by computer programs that are stored in the memory 5c (FIG. 1). Alternatively, functions of the blocks may be implemented by software, firmware, hardware or any combination thereof.

An operating condition detector 51 receives outputs from the intake air temperature sensor 9 and the engine water temperature sensor 10. A first difference calculator 52 calculates a first difference between the engine water temperature $Tw0$ at the time when the engine stops in a previous operating cycle and the engine water temperature $Tw1$ at the time when the engine starts in a current operating cycle. The first difference is represented as an absolute value. A diagnosis unit 53 determines that the engine water temperature sensor 10 is normal if the first difference is greater than a first reference value. The first reference value corresponds to the width "w" relative to the reference value $Tw0$ of the sticking range 43 shown in FIG. 3.

When the first difference is less than or equal to the first reference value, a second difference calculator 54 calculates a second difference by subtracting the intake air temperature $Ta0$ at the time when the engine stops in the previous operating cycle from the intake air temperature $Ta1$ at the time when the engine starts in the current operating cycle. If the second difference is less than a second reference value, the diagnosis unit 53 determines that the engine water temperature sensor 10 is faulty. The second reference value corresponds to the amount of change in the intake air temperature that defines the determination allowable area 44 shown in FIG. 3. In the example of FIG. 3, the second reference value is $-5°$ C. The fact that the amount of change $(Ta1-Ta0)$ is less than the second reference value implies that the intake air temperature has entered into the allowable determination area 44.

One of the purposes of providing the second difference calculator 54 is to determine whether the intake air temperature has entered into the allowable determination area 44. Those skilled in the art will recognize that a calculation method performed by the second difference calculator 54 may be modified depending on how the allowable determination area 44 is established.

According to one embodiment of the present invention, a failure determination permitting part 55 is provided as shown in FIG. 4. The failure determination permitting part 55 determines whether predetermined conditions for determining a failure of the engine water temperature sensor are met. It should be noted that it is optional to provide the failure determination permitting part 55.

During an operating cycle of the engine (that is, while the engine is operating), the failure determination permitting part 55 detects a possibility of a failure in the engine water temperature sensor 10. A process for detecting such possibility of a failure will be hereinafter referred to as a "possibility diagnosing process." The possibility diagnosing process performed during an operating cycle is distinct from the failure diagnosing process performed at engine start in accordance with the present invention. If a possibility of a failure in the engine water temperature sensor 10 is detected in the possibility diagnosing process, a flag FlgNG is set to a value of one. It should be noted that the engine water temperature sensor is not determined to be faulty during the possibility diagnosing process.

More specifically, in the possibility diagnosing process, the value of one is set in the flag FlgNG if at least one of the following conditions is met;

1) the engine water temperature does not change although the intake air temperature changes;
2) the engine water temperature does not change over a predetermined time period; and
3) the engine water temperature does not change although a predetermined amount of heat from the engine is observed.

Additional or alternative conditions may be specified. For example, in some cases, detecting a possibility of a failure in the engine water temperature sensor may be inappropriate in light of vehicle speed, a duration of time that an idle operation is performed, a duration of time that a fuel-cut operation is performed, or the like. In such cases, the value of one may be set in the flag FlgNG.

If any one of the following conditions is met, the flag FlgNG is set to zero because the failure diagnosing process performed at engine start according to the present invention may not be accurately performed under such conditions:

i) when a failure of the intake air temperature sensor is detected; and
ii) when another failure (for example, drift of the sensor) is detected in the engine water temperature sensor.

In an embodiment where the failure determination permitting part 55 is provided, if the second difference is less than the second reference value and the value of one is set in the flag FlgNG, the diagnosis unit 53 determines that the engine water temperature sensor 10 is faulty. If the second difference is less than the second reference value and the value of the flag FlgNG is zero, the diagnosis part 53 prohibits (or suspends) determining that the engine water temperature sensor 10 is faulty. Thus, when a possibility of a failure of the engine water temperature sensor is detected in a previous operating cycle, making the determination that the engine water temperature sensor is faulty is permitted in the failure diagnosing process performed at the engine start of a current operating cycle.

Alternatively, it may be determined in the possibility diagnosing process that the engine water temperature sensor is faulty in response to detection of a possibility of a failure of the engine water temperature sensor. In this case, if it is determined by the failure diagnosing process at engine start according to the present invention that the sensor is normal, the above "faulty" determination in the possibility diagnosing process is canceled.

When the vehicle is traveling, changes in the intake air temperature and the engine water temperature may become large depending on operating conditions of the engine. On the other hand, since the failure diagnosing process according to the present invention is performed at engine start, the determination whether the sensor is faulty is made with high reliability. Therefore, it is preferable to give priority to the determination result obtained in the failure diagnosing process at engine start of the current operating cycle according to the present invention rather than the determination result obtained in the possibility diagnosing process in the previous operating cycle.

In one embodiment of the present invention, if it is determined by the failure diagnosing process at engine start that the engine water temperature sensor is faulty, a warning light (MIL: malfunction indicator light) may be turned on to inform a driver that an abnormal event has occurred.

Figure 5:
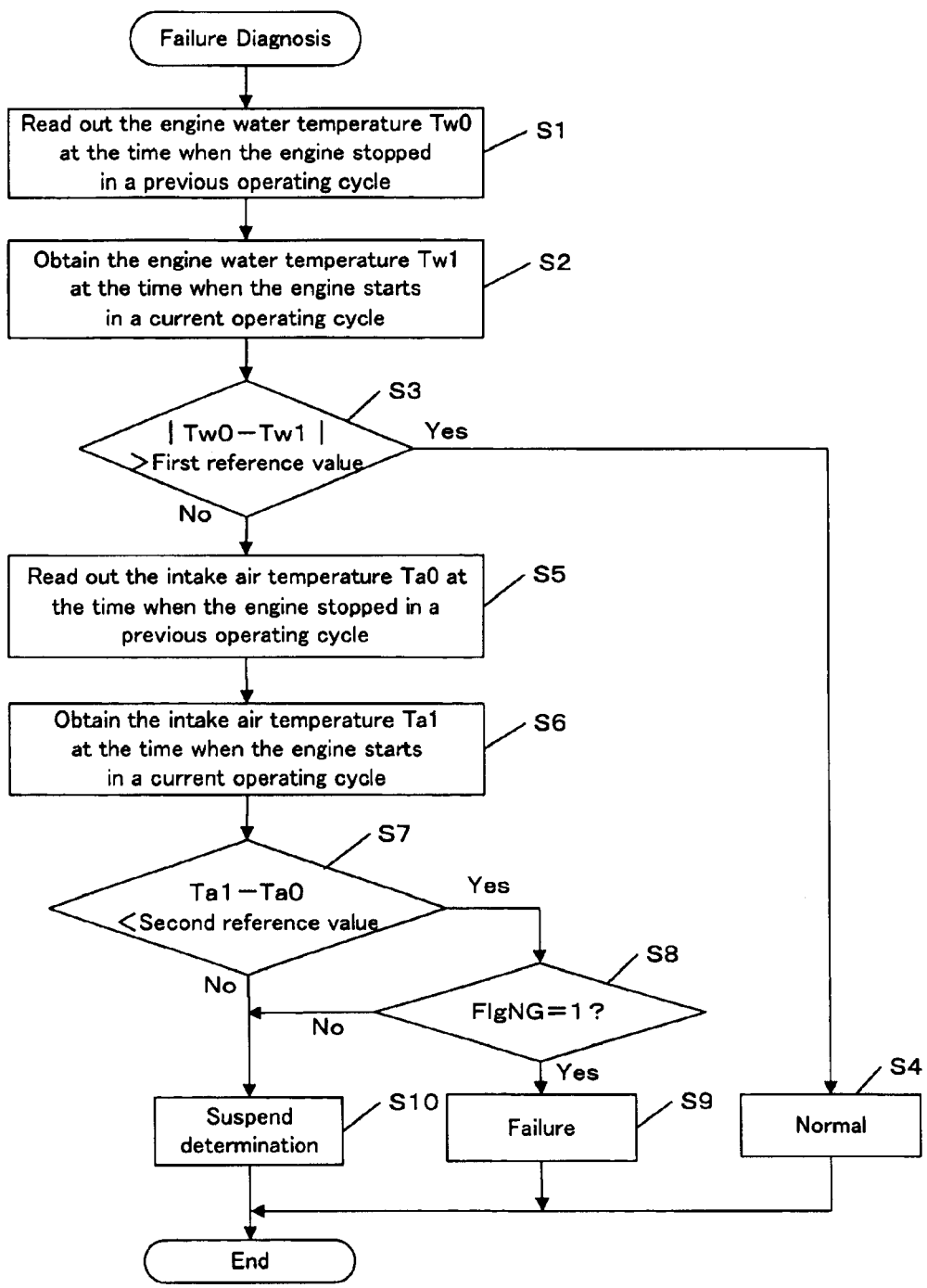
FIG. 5 shows a flowchart of a process for diagnosing a failure of an engine water temperature sensor in accordance with one embodiment of the present invention.

FIG. 5 is an exemplary flowchart of a process for diagnosing a failure of the engine water temperature sensor, which is performed by the failure diagnosing apparatus shown in FIG. 4. This process is performed at the time when the engine starts. It is preferable that this process is performed immediately after initial processes for various controls at engine start are completed.

In step S1, the engine water temperature Tw0 at the time when the engine stopped in a previous operating cycle is read out from the memory 5c (FIG. 1). In step S2, the engine water temperature Tw1 at the time when the engine starts in a current operating cycle is obtained from the engine water temperature sensor 10.

In step S3, a difference between the engine water temperatures Tw0 and Tw1 is calculated. It is determined whether the difference is greater than the first reference value. If the difference is greater than the first reference value, it implies that the engine water temperature has changed beyond the sticking range 43 (FIG. 3). In step S4, it is determined that the engine water temperature sensor 10 is normal.

In one embodiment of the present invention, the first reference value corresponds to the width "w" relative to the reference value Tw0 of the sticking range 43 as described above. The width w can be represented by a digital value having a predetermined number of bits (for example, w has a digital value of 3). In this case, if the difference between two digital values Tw0 and Tw1 is greater than the digital value of 3, it is determined that the engine temperature sensor 10 is normal.

If the difference between Tw0 and Tw1 is less than or equal to the first reference value, the process proceeds to step S5. In step S5, the intake air temperature Ta0 at the time when the engine stopped in the previous operating cycle is read out from the memory. In step S6, the intake air temperature Ta1 at the time when the engine starts in the current operating cycle is obtained from the intake air temperature sensor 9.

In step S7, it is determined whether the intake air temperature has entered into the allowable determination area 44. In this embodiment, the difference is calculated by subtracting the intake air temperature Ta0 from the intake air temperature Ta1 and then it is determined whether the calculated difference is less than the second reference value. The second reference value corresponds to the amount of change in the intake air temperature for defining the allowable determination area 44. In the example shown in FIG. 3, the second reference value is "−5° C." If the difference is less than the second reference value, it implies that the intake air temperature has entered into the allowable determination area 44. The process proceeds to step S8.

In step S7, if the difference is greater than or equal to the second reference value, there is a possibility of making an inaccurate diagnosis because the intake air temperature has not entered into the allowable determination area 44. Therefore, making the determination that the sensor is faulty is suspended in step S10.

In step S8, the flag FlgNG is examined. If FlgNG=1, it implies that other conditions for making the determination that the engine water temperature sensor is faulty are met in the previous operating cycle. In step S9, it is determined that the engine water temperature sensor is faulty. If FlgNG=0, the determination that the engine water temperature sensor is faulty is suspended (S10).

Figure 6:
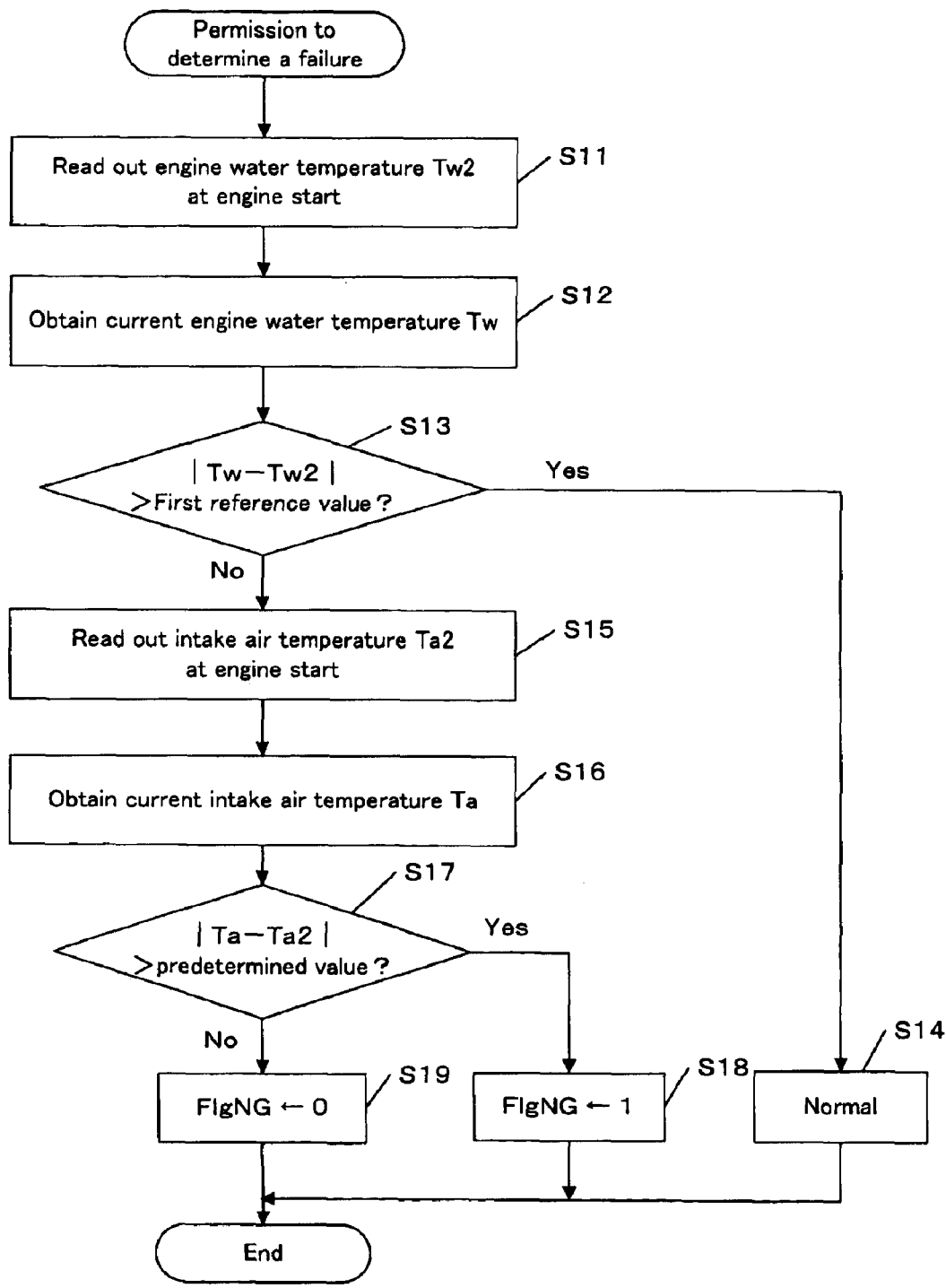
FIG. 6 is a flowchart of a process for determining whether a determination that an engine water temperature is faulty is permitted in accordance with one embodiment of the present invention.

FIG. 6 is an exemplary flowchart of a process for permitting determining whether the engine water temperature sensor is faulty according to one embodiment of the invention. This process is performed by the failure determination permitting part 55. This process is performed at a constant time interval during an operating cycle of the engine. In this process, it is determined whether the above-described condition 1) is met.

In step S11, the engine water temperature Tw2 at the time when the engine starts is read out from the memory 5c (FIG. 1). In step S12, a current engine water temperature Tw is obtained from the engine water temperature sensor 10.

In step S13, a difference between the engine water temperatures Tw and Tw2 is calculated. It is determined whether the difference is greater than the first reference value. If the difference is greater than the first reference value, it implies that the engine water temperature has changed beyond the sticking range 43 (FIG. 3). In step S14, it is determined that the engine water temperature sensor 10 is normal. The first reference value is the same as in step S3 of FIG. 5. If the difference is less than or equal to the first reference value, the process proceeds to step S15.

In step S15, the intake air temperature Ta2 at the time when the engine starts is read out from the memory. In step S16, a current intake air temperature Ta is obtained from the intake air temperature sensor 9.

In step S17, a difference between the intake air temperatures Ta and Ta2 is calculated. It is determined whether the difference is greater than a predetermined value. If the difference is greater than the predetermined value, it implies that the engine water temperature does not change although the intake air temperature changes. This indicates that there is a possibility of a failure in the engine water temperature sensor 10. In step S18, a value of one is set in the flag FlgNG. If the difference is less than or equal to the predetermined value, it implies that there is a possibility of making an erroneous determination regarding a failure of the sensor. In step S19, the flag FlgNG is set to zero.

Figure 7:
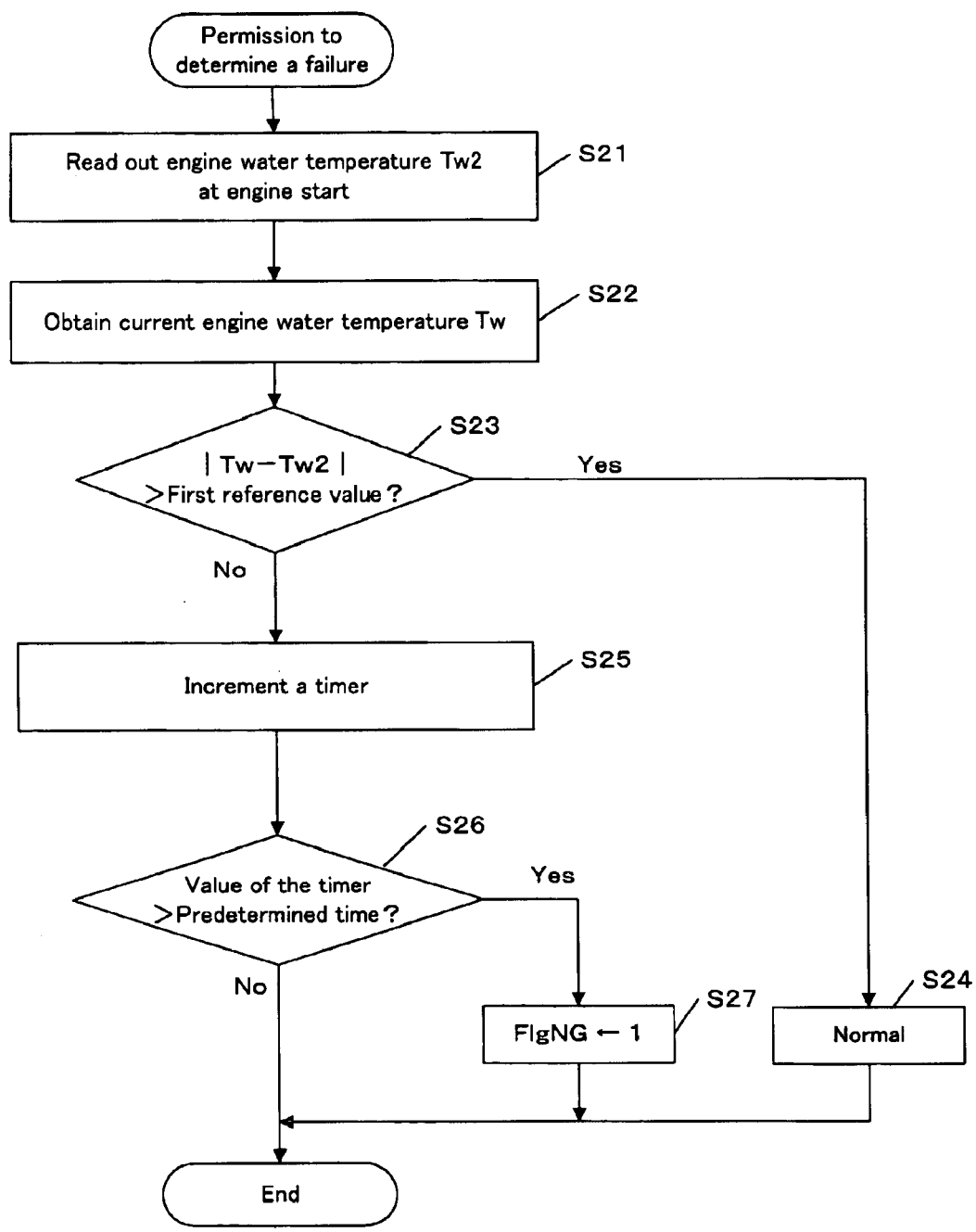
FIG. 7 is a flowchart of another process for determining whether a determination that an engine water temperature is faulty is permitted in accordance with another embodiment of the present invention.

FIG. 7 is a flowchart of a process for permitting determining whether the engine water temperature sensor is faulty, according to another embodiment of the invention. This process is performed at a constant time interval during an operating cycle. In this process, it is determined whether the above-described condition 2) is met.

Processes in steps S21 through S24 are the same as in steps S11 through S14.

In step S25, an elapsed time (from the time when the engine starts, for example) is measured by incrementing a timer. In step S26, it is determined whether a predetermined time has elapsed. If the difference between the engine water temperatures Tw and Tw2 is less than or equal to the first reference value when the predetermined time has elapsed, it implies that the engine water temperature does not change for the predetermined time. This indicates a possibility of a failure in the engine water temperature sensor 10. In step S27, the flag FlgNG is set to a value of one. If the predetermined time has not elapsed, the process terminates.

Figure 8:
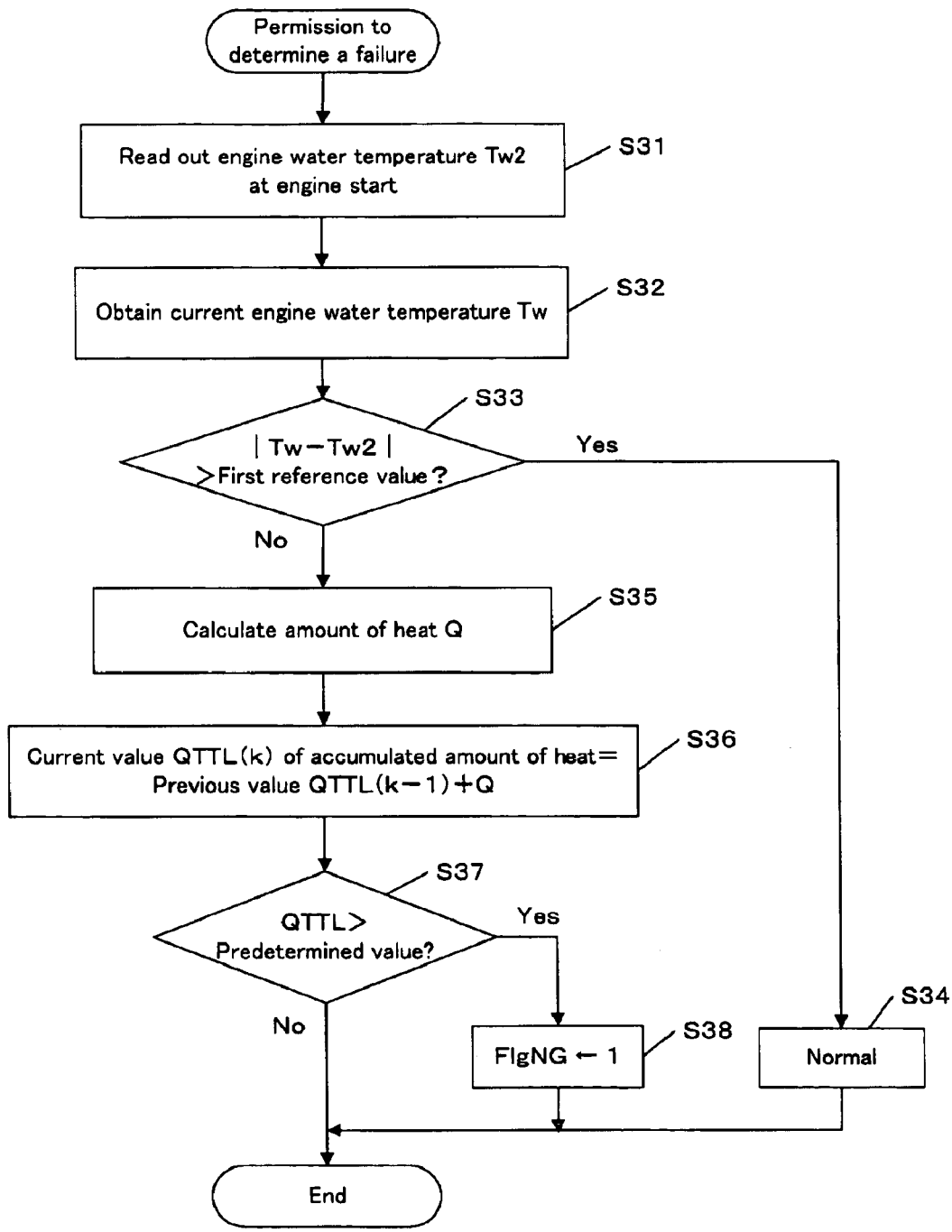
FIG. 8 is a flowchart of another process for determining whether a determination that an engine water temperature is faulty is permitted in accordance with another embodiment of the present invention.

FIG. 8 is a flowchart of a process for permitting determining whether the engine water temperature sensor is faulty, according to yet another embodiment of the invention. This process is performed at a constant time interval during an operating cycle. In this process, it is determined whether the above-described condition 3) is met.

Processes in steps S31 through S34 are the same as in steps S11 through S14.

In step S35, the amount of heat from the engine is calculated. For example, the amount of heat may be approximated by the amount of fuel injected per unit time. The amount of fuel injected per unit time is calculated in accordance with "the basic amount of injected fuel TIM×the frequency of a fuel injection operation per unit time". The basic amount of injected fuel TIM indicates the amount of fuel injected at a time by the fuel injection valve 6 (FIG. 1), which is typically determined based on the engine rotational speed NE and the intake air manifold pressure Pb. The frequency of a fuel injection operation per unit time can be determined based on the engine rotational speed NE.

In step S36, the heat amount Q thus calculated in step S35 is added to the previous value QTTL(k−1) of the accumulated amount of heat, to obtain the current value QTTL(k) of the accumulated amount of heat. Here, "k" indicates an identifier for identifying a cycle. Thus, the accumulated amount of heat over a predetermined time period is obtained.

In step S37, if the accumulated amount QTTL of heat is greater than a predetermined value, it implies that the engine water temperature does not change although the amount of heat from the engine is large. This indicates a possibility of failure in the engine water temperature sensor 10. In step S38, the flag FlgNG is set to a value of one. If the accumulated amount QTTL of heat is less than or equal to the predetermined value, the process terminates.

Figure 9:
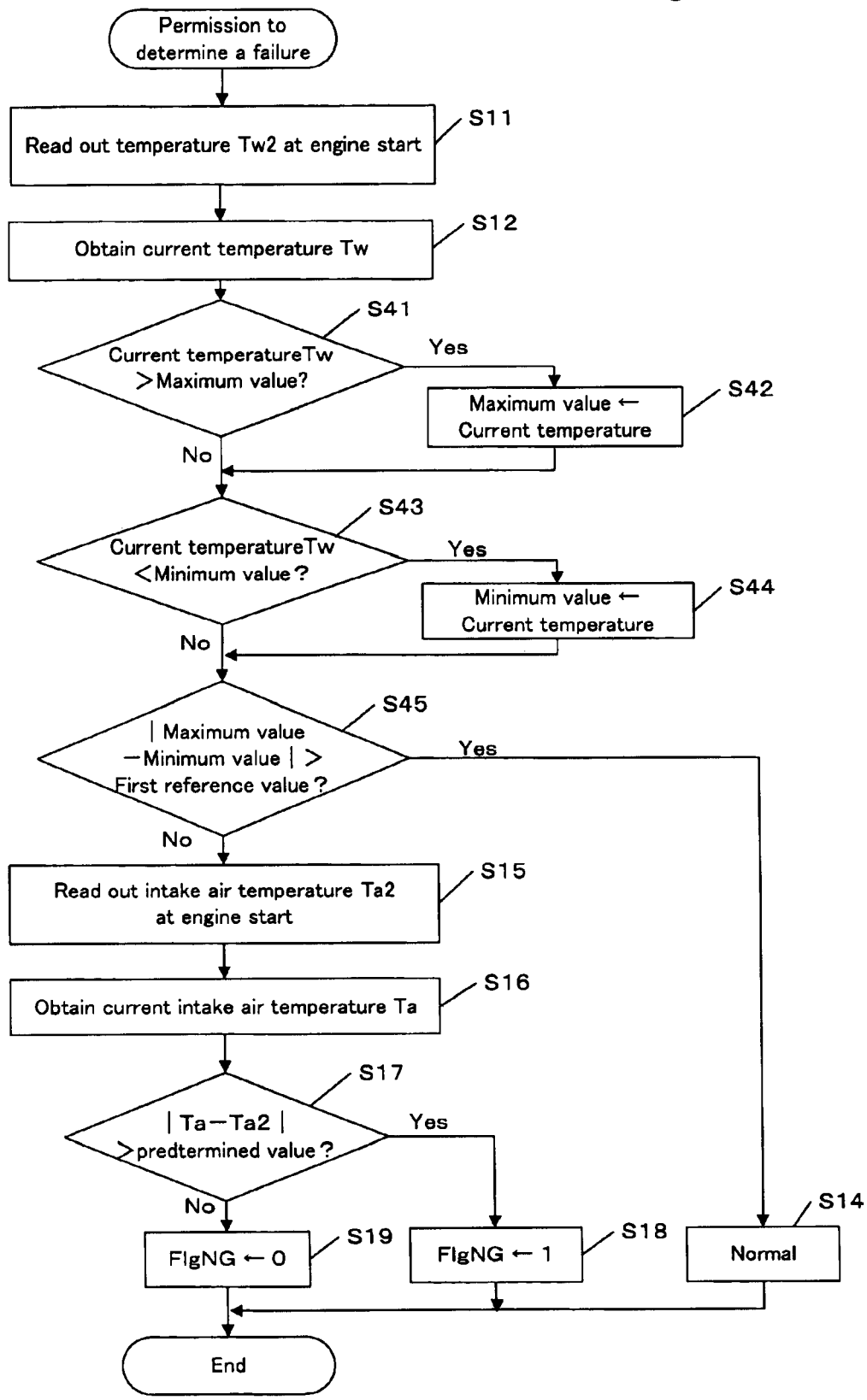
FIG. 9 is a flowchart of another process for determining whether a determination that an engine water temperature is faulty is permitted in accordance with another embodiment of the present invention.

FIG. 9 shows a flowchart of a process that is an improved version of the process shown in FIG. 6 for permitting determining whether the engine water temperature sensor is faulty. This process differs from FIG. 6 in that step S13 is replaced with steps S41 through S45.

If the current engine water temperature Tw is greater than a maximum value that is stored in the memory 5c (S41), the maximum value is updated with the current engine water temperature Tw (S42). If the current engine water temperature Tw is less than a minimum value that is stored in the memory 5c (S43), the minimum value is updated with the current engine water temperature Tw (S44). In step S45, a difference between the maximum value and the minimum value is calculated. It is determined whether the difference is greater than the first reference value. By examining the maximum and minimum values, the amount of change in the engine water temperature that is surely detected by the engine water temperature sensor 10 is more accurately obtained.

Each of step S23 in FIG. 7 and step S33 in FIG. 8 may be replaced with steps S41 through S45 shown in FIG. 9.

The invention may be applied to an engine to be used in a vessel-propelling machine such as an outboard motor in which a crankshaft is disposed in the perpendicular direction.

What is claimed is:

1. A failure diagnosing apparatus comprising:
    a first sensor for detecting a temperature of cooling water of an engine mounted on a vehicle;
    a second sensor for detecting a temperature associated with the engine;
    a first calculating means for calculating a first difference between a temperature detected by the first sensor at the time when the engine stops in a previous operating cycle of the engine and a temperature detected by the first sensor at the time when the engine starts in a current operating cycle of the engine;
    a second calculating means for calculating a second difference between a temperature detected by the second sensor at the time when the engine stops in the previous operating cycle and a temperature detected by the second sensor at the time when the engine starts in the current operating cycle; and
    a determining means for determining whether the first sensor is faulty based on the first difference and the second difference.

2. The failure diagnosing apparatus of claim 1, wherein the determining means determines that the first sensor is faulty if a magnitude of the first difference is less than or equal to a predetermined value when the second difference is less than a predetermined value.

3. The failure diagnosing apparatus of claim 1, wherein the temperature associated with the engine includes a temperature of air that is introduced into the engine.

4. The failure diagnosing apparatus of claim 1, wherein the determining means determines that the first sensor is normal if a magnitude of the first difference is greater than a predetermined value.

5. The failure diagnosing apparatus of claim 1, wherein the determining means prohibits the determination that the first sensor is faulty if a magnitude of the first difference is less than or equal to a predetermined value when the second difference is greater than or equal to a predetermined value.

6. The failure diagnosing apparatus of claim 1, further comprising a permitting means for permitting the determination that the first sensor is faulty if a possibility of a failure of the first sensor is detected in the previous operating cycle.

7. The failure diagnosing apparatus of claim 6, wherein the permitting means determines the possibility of a failure of the first sensor if at least one of the following conditions is met:
    1) a temperature detected by the first sensor does not change although a temperature detected by the second sensor changes;
    2) a temperature detected by the first sensor does not change over a predetermined time period; and
    3) a temperature detected by the first sensor does not change although a predetermined amount of heat from the engine is observed.

8. A method for diagnosing a failure of a first sensor that detects a temperature of cooling water of an engine mounted on a vehicle, the vehicle comprising a second sensor that detects a temperature associated with the engine, the method comprising the steps of:
    calculating a first difference between a temperature detected by the first sensor at the time when the engine stops in a previous operating cycle of the engine and a temperature detected by the first sensor at the time when the engine starts in a current operating cycle of the engine;
    calculating a second difference between a temperature detected by the second sensor at the time when the engine stops in the previous operating cycle and a temperature detected by the second sensor at the time when the engine starts in the current operating cycle; and
    determining whether the first sensor is faulty based on the first difference and the second difference.

9. The method of claim 8, wherein the step of determining further comprises the step of:
    determining that the first sensor is faulty if a magnitude of the first difference is less than or equal to a predetermined value when the second difference is less than a predetermined value.

10. The method of claim 8, wherein the temperature associated with the engine includes a temperature of air that is introduced into the engine.

11. The method of claim 8, wherein the step of determining further comprises the step of:

determining that the first sensor is normal if a magnitude of the first difference is greater than a predetermined value.

12. The method of claim 8, wherein the step of determining further comprises the step of:
prohibiting the determination that the first sensor is faulty if a magnitude of the first difference is less than or equal to a predetermined value when the second difference is greater than or equal to a predetermined value.

13. The method of claim 8, further comprising the step of permitting the determination that the first sensor is faulty if a possibility of a failure of the first sensor is detected in the previous operating cycle.

14. The method of claim 13, wherein the permitting step further comprises the step of determining the possibility of a failure of the first sensor if at least one of the following conditions is met:
1) a temperature detected by the first sensor does not change although a temperature detected by the second sensor changes;
2) a temperature detected by the first sensor does not change over a predetermined time period; and
3) a temperature detected by the first sensor does not change although a predetermined amount of heat from the engine is observed.

15. A computer program stored on a computer readable medium for use in diagnosing a failure of a first sensor that detects a temperature of cooling water of an engine mounted on a vehicle, the vehicle comprising a second sensor that detects a temperature associated with the engine, the computer program comprising:
program code for calculating a first difference between a temperature detected by the first sensor at the time when the engine stops in a previous operating cycle of the engine and a temperature detected by the first sensor at the time when the engine starts in a current operating cycle of the engine;
program code for calculating a second difference between a temperature detected by the second sensor at the time when the engine stops in the previous operating cycle and a temperature detected by the second sensor at the time when the;engine starts in the current operating cycle; and
program code for determining whether the first sensor is faulty based on the first difference and the second difference.

16. The computer program of claim 15, wherein the program code for determining further comprises a program code for determining that the first sensor is faulty if a magnitude of the first difference is less than or equal to a predetermined value when the second difference is less than a predetermined value.

17. The computer program of claim 15, wherein the temperature associated with the engine includes a temperature of air that is introduced into the engine.

18. The computer program of claim 15, wherein the program code for determining further comprises a program code for determining that the first sensor is normal if a magnitude of the first difference is greater than a predetermined value.

19. The computer program of claim 15, wherein the program code for determining further comprises a program code for prohibiting the determination that the first sensor is faulty if a magnitude of the first difference is less than or equal to a predetermined value when the second difference is greater than or equal to a predetermined value.

20. The computer program of claim 15, further comprising a program code for permitting the determination that the first sensor is faulty if a possibility of a failure of the first sensor is detected in the previous operating cycle.

21. The computer program of claim 20, wherein the program code for permitting further comprises a program code for determining the possibility of a failure of the first sensor if at least one of the following conditions is met:
1) a temperature detected by the first sensor does not change although the temperature detected by the second sensor changes;
2) a temperature detected by the first sensor does not change over a predetermined time period; and
3) a temperature detected by the first sensor does not change although a predetermined amount of heat from the engine is observed.

* * * * *